Sept. 29, 1936.    J. A. WILHELM ET AL    2,055,739
SETTING MECHANISM
Filed July 16, 1934    2 Sheets-Sheet 1
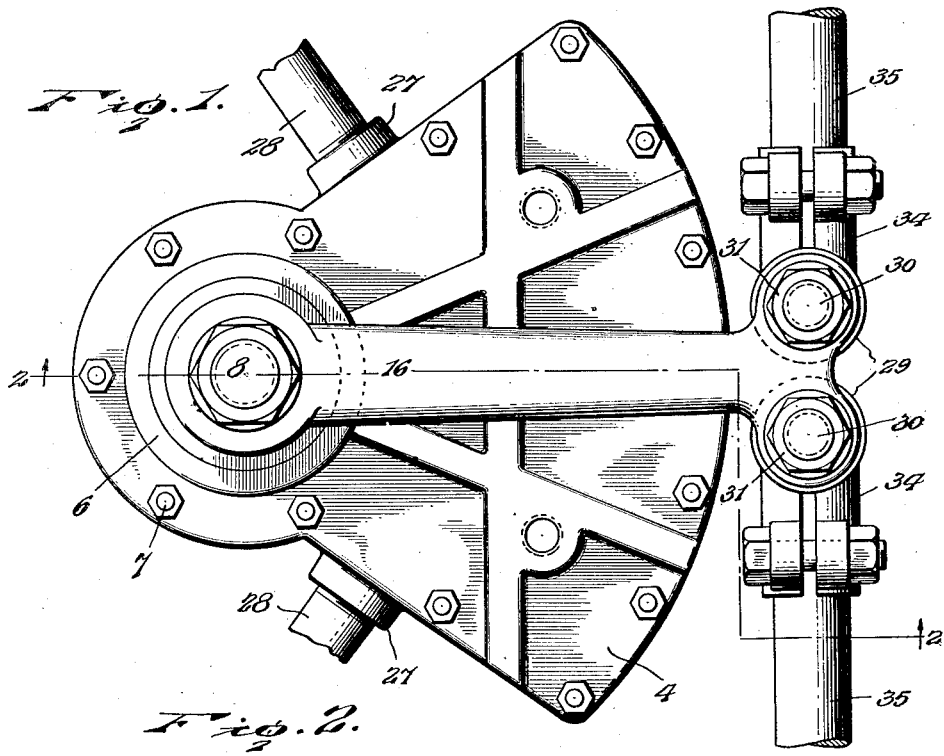
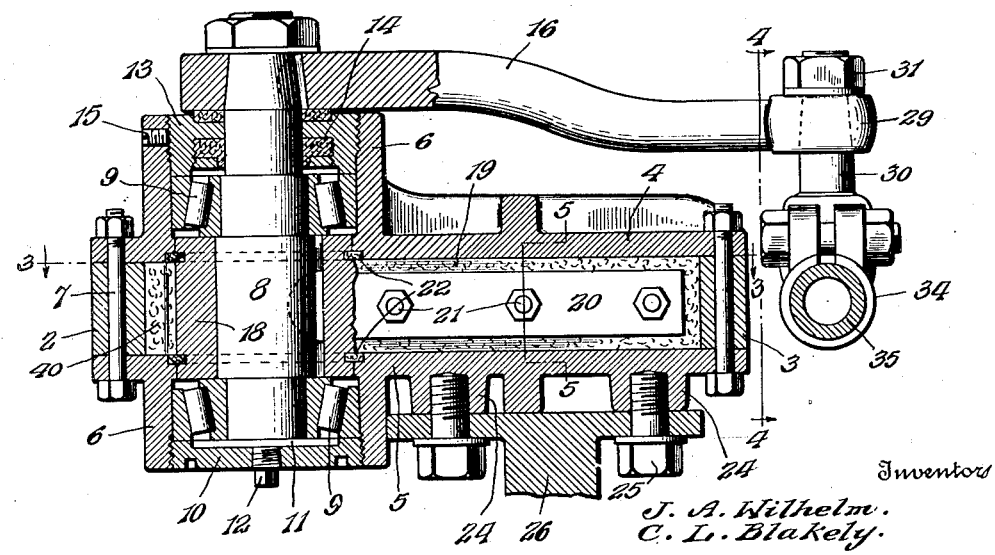

Sept. 29, 1936.  J. A. WILHELM ET AL  2,055,739
SETTING MECHANISM
Filed July 16, 1934   2 Sheets-Sheet 2
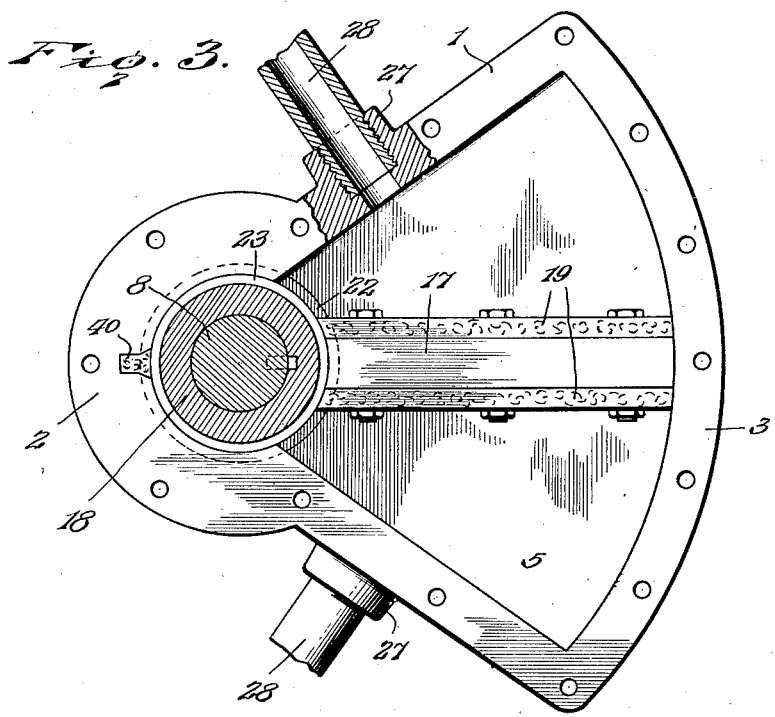
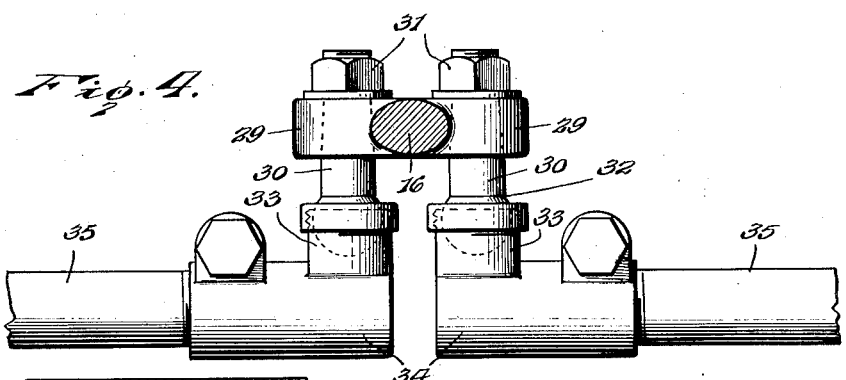
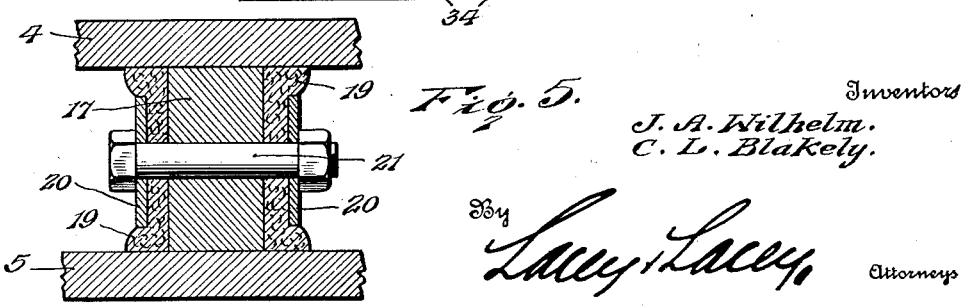

Patented Sept. 29, 1936

2,055,739

UNITED STATES PATENT OFFICE 2,055,739

SETTING MECHANISM

John A. Wilhelm, North Bend, and Carl L. Blakely, Snoqualmie Falls, Wash.

Application July 16, 1934, Serial No. 735,542

1 Claim. (Cl. 121—38)

This invention relates to a fluid motor intended primarily for use in a hydraulic steering mechanism, but may be advantageously employed in other fields, as, for instance, in adjusting the ventilators of green houses. The invention has for its object the provision of a compact apparatus of simple construction which may be easily operated to set controlled members in a desired position, and it is also an object of the invention to provide such an apparatus which may be actuated through hydraulic pressure and which will be so constructed that escape of the actuating fluid and loss of the same will be prevented. The invention is illustrated in the accompanying drawings and will be hereinafter fully set forth and particularly defined.

In the drawings:

Figure 1 is a plan view of an apparatus embodying our invention.

Figure 2 is a section on the line 2—2 of Figure 1.

Figure 3 is a view partly in plan and partly in section on the line 3—3 of Figure 2.

Figure 4 is a somewhat enlarged detail elevation with parts in section on the line 4—4 of Figure 2.

Figure 5 is an enlarged detail section on the line 5—5 of Figure 2.

The invention comprises a casing or chamber including a wall 1 of a general triangular form having a circular body 2 at the corner or apex of the triangle, the opposite portion of the wall being arcuate, as shown at 3. Top and bottom plates 4 and 5 are secured to the upper and lower edges of the side wall and these top and bottom plates have hub members 6 on their outer faces which are adapted to aline axially with the circular portion 2 of the side wall and be secured thereto by bolts 7, as shown and as will be understood. A shaft 8 is disposed centrally within the hubs 6 and through the cylindrical body 2 of the side, and within the hubs anti-friction bearings 9 are provided to facilitate rotation of the shaft in the use of the apparatus. The lower hub is closed by a plug or cap plate 10 having a recess 11 in its upper side and having a central opening normally closed by a plug 12. The provision of this cap plate 10 permits a lubricant to be applied to and held to the lower end of the shaft and the bearings so that wear upon the parts will be minimized and binding of the parts will be avoided. The upper hub is also closed by a plug 13 which fits therein around the upper portion of the shaft and has packing 14 secured in its bore around the shaft to prevent the loss of lubricant which may be supplied to the shaft and to the upper bearings 9. A set screw 15 may be provided in the wall of the hub to engage the side of the plug and thereby guard against accidental removal and loss of the plug. Upon the upper end of the shaft, above the hub 6, a lever or arm 16 is secured to the shaft to rotate therewith, and secured to the central portion of the shaft and adapted to turn therewith is a piston or vane 17 which has a hub member 18 at one end fitting closely around the shaft and keyed thereto, as shown in Figures 2 and 3. The piston or blade 17 extends from its hub portion to the arcuate wall 3 of the side of the main chamber or body of the apparatus and packing 19 is provided upon both sides of the blade to fit against the top and bottom plates 4 and 5 and against the end wall 3 so as to prevent leakage of the actuating fluid around the piston or blade, as shown clearly in Figure 2. The packing is held to the sides of the blades by clamping plates 20 disposed against the outer surfaces of the packing and secured by bolts 21 inserted through the blade and the packing and the clamping plates. The hub member 18 is provided adjacent its upper and lower ends with annular grooves 23 and packing rings 22 are fitted in said grooves and overlap the edges of the packing members 19 and the ends of a packing strip 40, disposed between the hub and the wall of the body or casing, so that leakage of the actuating fluid around the hub member will be prevented. The bottom plate 5 is provided on its underside with interiorly threaded bosses 24 in which cap screws, indicated at 25, may be engaged to secure the device in position upon a fixed support, such as the front axle or frame of an automobile, indicated at 26. The straight sides of the main chamber are formed with nipples 27 in which are secured the ends of pipes 28 which connect with a controlling valve of any approved form.

The free end of the arm or lever 16 is provided with two vertically disposed eyes 29 engaged around posts 30 equipped with securing nuts 31 at their upper ends. The lower ends of the posts 30 are formed into balls, indicated at 32, which are received in sockets 33 on the upper sides of the split sleeves 34. Said sleeves 34 are clamped upon the inner opposed ends of tie rods 35 which extend in opposite directions to the wheel-carrying spindles of the steering mechanism of an automobile or other elements which are to be controlled.

It is thought the operation and advantages of the device will be readily understood and appreciated from the foregoing description, taken in connection with the accompanying drawings. The entire mechanism, including the controlling valve which is not illustrated, is filled with a noncompressible fluid, such as oil, and, consequently, when the fluid is entering the triangular chamber, through one of the pipes 28, it will be exhausting from the opposite side of the chamber through the opposite pipe 28 and the blade or piston 17 will, consequently, be forced to turn toward the exhausting side of the chamber. The shaft 3 will, of course, turn with the blade or piston and the lever 16 will, of course, swing to one side or the other, accordingly as the shaft is turned in one or the opposite direction. The movement of the lever 16 will be transmitted directly to the tie rods or other elements 38 so that the members to be controlled will be set in the desired position. Assuming that the device is mounted at the center of the front axle or the frame of an automobile, it is obvious that the vehicle may be made to travel toward one or the opposite side by properly setting the controlling valve and causing the actuating fluid to exhaust from one side of the triangular chamber and enter through the opposite side thereof. The vehicle can thus be very easily made to travel in the desired direction. As before stated, the device is intended primarily for application to an automobile but it may be employed upon motor boats, or airplanes, or in other places wherever it is desired to shift elements to a set position and maintain them in that position.

Having thus described the invention, we claim:

Apparatus of the type described comprising a body defining a well and an arcuate working chamber extending radially therefrom and having opposite side walls diverging from the well and formed with ports for the circulation of an actuating fluid, a shaft extending through said well axially thereof, a blade mounted in the chamber for oscillation under the influence of the actuating fluid, packing elements secured against opposite side faces of the blade and having marginal edge faces in contact with the top and bottom of the chamber, a hub member at one end of the blade mounted about said shaft within the well and formed with circumferentially extending grooves near its upper and lower ends, walls of the well being formed with annular grooves registering with the grooves of the hub, packing rings fitted in said grooves of the hub and well and overlapping upper and lower edge faces of the blade and the packing elements secured against the side faces of the blade, and a packing strip mounted in a groove formed in the wall of the well in position to bear against the hub longitudinally thereof with its upper and lower ends overlapped by the packing rings.

JOHN A. WILHELM.
CARL L. BLAKELY.